United States Patent [19]

Gerdes et al.

[11] Patent Number: 5,384,302

[45] Date of Patent: Jan. 24, 1995

[54] CATALYST CARRIER

[75] Inventors: William H. Gerdes, Hudson; Donald J. Remus, Stow; Thomas Szymanski, Hudson; James A. Wolford, Stow, all of Ohio

[73] Assignee: Norton Chemical Process Products Corp., Worcester, Mass.

[21] Appl. No.: 118,487

[22] Filed: Sep. 8, 1993

[51] Int. Cl.6 .................. B01J 32/00; B01J 21/04; C01F 7/02
[52] U.S. Cl. .................. 502/439; 423/628; 502/351; 502/355
[58] Field of Search .............. 502/439, 355, 351; 423/628

[56] References Cited

U.S. PATENT DOCUMENTS 3,850,849 11/1974 Kiovsky et al. .............. 502/355
3,923,646 12/1975 Hilfman .............. 502/439
3,983,197 9/1976 Mitsche et al. .............. 423/628
4,102,813 7/1978 Kimura et al. .............. 252/430
4,102,978 7/1978 Kiovsky .............. 502/439
4,919,903 4/1990 Gandhi et al. .............. 423/213.5
5,039,650 8/1991 Yamada et al. .............. 502/304
5,055,442 10/1991 Osaka et al. .............. 502/439
5,100,859 3/1992 Gerdes et al. .............. 502/439

FOREIGN PATENT DOCUMENTS 4363139 12/1992 Japan .............. B01J 23/50

Primary Examiner—Paul E. Konopka
Attorney, Agent, or Firm—David Bennett

[57] ABSTRACT

A catalyst carrier that is comprised of relatively large alpha alumina particles dispersed in matrix that comprises an alpha alumina formed in situ by a sol-gel process has excellent crush resistance while retaining good porosity and catalytic performance.

20 Claims, No Drawings

CATALYST CARRIER

This invention relates to catalyst carriers and specifically to catalyst carriers based on alumina that may be used as supports for metal and metal oxide catalyst components of use in a variety of chemical reactions.

BACKGROUND OF THE INVENTION

The use of alumina based catalyst carriers has previously been described in a number of patents including U.S. Pat. Nos. 5,100,859; 5,055,442; 5,037,794; and 4,874,739. Such carriers have a wide variety of potential applications in the catalytic field and are especially useful where the alumina base is alpha alumina.

A catalyst support needs to possess, in combination, at least a minimum surface area on which the catalytic component may be deposited, high water absorption and crush strength. The problem is that usually an increase in one can mean a reduction in another property. Thus high crush strength may mean low porosity. Often the balance is achieved by trial and error making the catalyst carrier art even more unpredictable than other chemical process art.

A way has now been found to design carriers with more confidence as to the final property balance. The carriers of the invention have an excellent balance of crush strength, abrasion resistance, porosity and catalytic performance that make them ideal for a range of catalytic applications. They are based on alpha alumina and the novel process by which they are made assures high porosity and excellent crush strength.

DESCRIPTION OF THE INVENTION

The present invention provides a novel alpha alumina based catalyst carrier having a crush strength, (as measured on a Compton Tensile Tester, model 50-OP), of at least 5 pounds and a settled packing density, (as measured by ASTM D-4699-87, modified by the use of cylinder with an inside diameter of $3\frac{3}{4}$ inches and a length of 18 inches), of at least 38 pounds/cubic foot which comprises first and second alpha alumina components with a first alpha alumina component in the form of particles having an average crystallite size of from about 0.4 to about 4 microns providing from about 95 to about 40% of the total weight of alpha alumina in the carrier, and a second alpha alumina component generated in situ by a sol-gel process and providing the balance of the alpha alumina in the carrier.

The alpha alumina generated in situ is readily distinguished from the pre-formed alpha alumina particles present in the carrier of the invention. In a photomicrograph of the carrier the preformed alpha alumina appears as clearly identifiable individual particles with no internal porosity. By contrast the sol-gel alpha alumina formed in situ has a vermicular structure, that is, it has no clearly defined particulate structure and extensive porosity.

The invention also comprises a process for the production of a catalyst carrier which comprises:
i) forming a mixture comprising:
  a. at least one alpha alumina component with an median particle size of from 3 to about 8 microns and:
  b. a hydrated precursor of alpha alumina in an amount sufficient to provide from about 5 to about 60% by weight of the total weight of alpha alumina in the catalyst carrier product;
  c. from about 5 to about 40% based on the weight of the alpha alumina, of a burnout material; and
  d. water in sufficient quantity to extrude the above mixture;
ii) extruding the mixture into the desired shapes; and
iii) firing to convert the precursor of alpha alumina to alpha alumina so as to produce a catalyst carrier in which alpha alumina particles with a median particle size of from about 3 to about 8 microns are dispersed in a matrix of alpha alumina derived from the precursor material.

The catalyst carrier of the invention may comprise a number of alpha alumina components chosen to contribute to the desired physical properties, including porosity, pore volume, crush strength and the like. Often a combination of two different alpha aluminas is preferred, one component having larger particles mixed with a second component having smaller particles, in weight ratios of from about 10:90 to 90:10. The objective of this is to end up with a surface area, (in this document a reference to "surface area" is understood to mean the BET surface area measured using nitrogen or krypton as the adsorbed gas), in the finished product of from about 0.4 to about 5 $m^2/gm$. The surface area in the finished carrier is somewhat less than for the free alumina particles. Thus a convenient mixture may comprise for example, two types of alpha alumina particles, the first having a surface area of about 1 $m^2/gm$ and the second having a surface area of about 3 to 5 $m^2/gm$.

The precursor of alpha alumina is preferably based on boehmite but good results are also obtained if the precursor comprises a mixture of boehmite with an aluminum trihydrate such as gibbsite or bayerite. Where such a mixture is used it is often preferred to use a weight ratio of the monohydrate, (boehmite), to trihydrate of from about 1:10 to about 1:3 and more preferably from about 1:8 to about 1:4. It is often preferred that, when a sol is formed from the precursor by addition of water, a submicron particle sized seed material is also added. This has the effect of reducing the temperature at which the transition to alpha alumina occurs and reduces the crystal size of the alpha alumina produced upon transformation.

The seed used can be any material that is effective to produce nucleation sites in the precursor so as to reduce the transition temperature at which a transition alumina converts to alpha alumina. Seeds that accomplish this goal generally have the same crystal lattice type as alpha alumina itself and lattice dimensions that do not differ by too much from those of alpha alumina. Clearly the most convenient seed is alpha alumina itself and sub-micron sized particles of alpha alumina are the preferred seed. It is however possible to use other seeds such as alpha ferric oxide and chromium oxide and certain complex oxides of titanium.

The alpha alumina formed from the preferred seeded precursor when the extruded mixture is fired generally has a much finer crystal size than the alpha alumina particles with which the seeded precursor is mixed unless, during firing, it is maintained at a high temperature for a prolonged period. As produced, the seeded sol-gel material has a sub-micron crystal structure but if it is held at temperatures over 1400° C. for extended periods, crystal growth begins and the size differentiation may become less apparent.

The carrier of the invention preferably has a porosity of at least 50% and more desirably from about 60 to about 75%. The porosity is related to the surface area which is preferably from about 0.4 to about 5, and more preferably from about 0.6 to about 1.2 square meters/gram.

It is often found advantageous to add titania to the mixture to be extruded in an amount that represents from about 0.05 to about 0.5%, and more preferably from about 0.08 to about 0.4% of the weight of the fired carrier. Certain forms of alumina and bond material may also contain titania as impurities or components. The contribution of such forms of titania are not included in the amounts specified above. The titania can be added as the dioxide, as a titanate or as a precursor of titania. In the following description all the above options are understood to be included under the term "titania". It is believed that the titania may function as a form of crystal growth inhibitor in the alpha alumina formed as a result of the conversion of the seeded precursor. It may be anticipated therefore that other such materials that can act in this capacity, such as zirconia and magnesia, might have utility as replacements for titania.

The titania is preferably in the form of a powder with a relatively high surface area such from about 8 to about 300 square meters/gram. In practice the preferred titanias have an amorphous or anatase structure as the rutile structure commonly has a much smaller surface area. Commercial pigment grades of titania can often give good results.

When the carrier comprises a titania component, it is often found that surface areas are in the lower end of the ranges discussed above. In spite of this lower surface area such carriers give good results in terms of the performance of catalysts supported on the carrier.

While it would appear that the alpha alumina formed from the seeded precursor acts in some sense as a matrix binder holding the rest of the alpha alumina particles together, it is usually preferred to add a ceramic bond material to the mixture to give added strength to the fired carrier. Conventional ceramic bond materials can be used and after firing these typically comprise components, (expressed as the oxides), such as silica, alumina, alkaline earth metal oxides, alkali metal oxides, iron oxide and titanium oxide, with the first two being the dominant components.

DESCRIPTION OF PREFERRED EMBODIMENTS

The invention is further described with reference to the following examples which are for the purposes of illustration only and are not intended to imply any necessary limitation on the essential scope of the invention.

EXAMPLE 1

This Example details the preparation of the carriers made using the formulations described in the following Examples.

The ceramic components are mixed with a burn-out material, (walnut shell flour), and boric acid for about a minute. Water and the seed component are added, the water being in an amount that is necessary to make the mixture extrudable. Generally this is about 30% by weight. The mixture is mixed for about two to four minutes and then about 5% by weight based on the weight of the ceramic components, of vaseline is added as an extrusion aid. The mixture is then mixed for a further 2 to 4 minutes before being extruded in the form of hollow cylinders and dried to less than 2% uncombined water. These were then fired in a tunnel kiln with a maximum temperature of about 1500° C. for about 4 hours.

EXAMPLE 2

In this Example three carriers according to the invention are described in terms of their formulation, (Table 1) and their physical properties and catalytic performance when used in conjunction with a standard commercial catalyst to produce ethylene oxide, (Table 2). The performance is compared against a standard commercial catalyst/carrier combination using the same catalyst.

TABLE 1

| CARRIER COMPOSITION | CARRIER A | CARRIER B | CARRIER C |
| --- | --- | --- | --- |
| ALPHA #1* | 46.6% | 45.2% | 46.6% |
| ALPHA #2* | 18.7% | 18.7% | 28.0% |
| ALPHA #3* (SEED) | 0.9% | 0.9% | 0.9% |
| GIBBSITE* | 28.0% | 28.0% | 18.7% |
| BOEHMITE* | 4.5% | 4.5% | 4.5% |
| CERAMIC BOND* | 1.3% | 2.7% | 1.3% |
| ORGANIC BURNOUT** | 11% | 16% | 11% |
| PETROLEUM JELLY** | 5% | 5% | 5% |
| BORIC ACID** | 0.15% | 0.15% | 0.15% |
| WATER | about 30% | about 30% | about 30% |

*indicates "ceramic components" and percentages given are based on 100% of the ceramic components.
**percentages are based on total weight of ceramic components.

Water is added in an amount to make the above mixture extrudable.

"Alpha #1" is a commercial alpha alumina that has a median particle size of 3 to 3.4 microns, a BET surface area of about 0.9 to about 1.4 m$^2$/gm, a crystallite size of 1.6 to 2.2 microns and a soda content of 0.02 to 0.06%.

"Alpha #2" is an alpha alumina with a median particle size of 4.0 to 8.0 microns, a surface area of 3.0 to 5.0 m$^2$/gm, a crystallite size of from 0.4 to 0.8 micron and a soda content of 0.1 to 0.3%

"Alpha #3" is an alpha alumina that was used as the seed for the gibbsite and boehmite precursors of alpha alumina. Its median particle size was less than 0.1 micron.

The gibbsite had a median particle size of from 4.0 to 20 microns and the boehmite was dispersible as a sol.

The ceramic bond contained components, (expressed as the oxides), in the following approximate proportions: 60% silica, 29% alumina, 3% of calcium oxide, 2% of magnesia, 4% of alkali metal oxides and less than 1% each of ferric oxide and titania.

TABLE 2

| PROPERTY | CARRIER A | CARRIER B | CARRIER C |
| --- | --- | --- | --- |
| Select. (1) | +1.05/−0.05 | +1.05/−6.5 | +1.25/−2 |
| Surface Area | 1.15 m$^2$/gm | 0.912 m$^2$/gm | 0.97 m$^2$/gm |
| Pack. Density | 45.8 lb/ft$^3$ | 48.4 lb/ft$^3$ | 46 lb/ft$^3$ |
| Crush Strength | 13.8 lb | 15.5 lb | 18.09 lb |
| Attrition | 21.7% | 18.09% | 19.8% |

The above Table includes certain measurement criteria that are used throughout this specification to describe the results obtained. Where these are not further explained in the context, they have the meanings described below:

(1) "Selectivity" This is measured using a standard catalyst formulation deposited on the carrier and assessed against the selectivity shown by the same standard catalyst on a standard carrier. In each case a standard gas flow containing ethylene, oxygen and inert gases and comprising 25% by volume of ethylene was passed over the catalyst. The standard conditions are those to achieve a conversion of 40% of the oxygen content of the flow. Clearly if the selectivity of the standard can be exceeded by even a small amount, this is an advantage. This is even more attractive if it can be achieved at a lower temperature.

The standard catalyst/carrier combination, under the conditions of the evaluation had a selectivity of 81.2% at a reaction temperature of 230° C. Table 2 above indicates the average of two runs. The first figure given is the increase in selectivity in percentage points over the standard catalyst/carrier combination and the second figure indicates the temperature difference in degrees at which the selectivity figure was obtained. Thus, for example, "+1/−4" would indicate that the selectivity was 1% better than the standard and this was achieved at 4° C. below the temperature at which the standard catalyst/carrier operated.

"Pack. Density" is the settled packing density as measured by ASTM D-4699-87, modified as described above, or the equivalent.

The "Crush Strength" (occasionally called "C.S."), of the carrier is measured as described above.

"Attrition" is the amount of catalyst weight loss measured using ASTM D-4058-92.

The "surface area" is the BET surface area measured using nitrogen or krypton as the adsorbate.

As can be seen, the carriers in accordance with the invention allow a higher degree of selectivity to the desired product while operating at a lower temperature. These improvements are considered extremely significant.

EXAMPLE 3

In the pair of experiments that comprise this Example, the effect of the presence of the sol-gel derived component is determined.

The formulations that were used to make the carriers is set forth in Table 3 and the physical properties and selectivity, (assessed as in Example 2) are described in Table 4.

TABLE 3

| COMPONENT | WITH SOL-GEL COMPONENT Wt % | NO SOL-GEL COMPONENT Wt % |
|---|---|---|
| ALPHA ALUMINA #1 | 48.7 | 50.6 |
| ALPHA ALUMINA #2 | 42.25 | 48.1 |
| ALPHA ALUMINA SEED | 0.5 | 0 |
| DISPERSIBLE BOEHMITE | 7.25 | 0 |
| CERAMIC BOND | 1.3 | 1.3 |
| ORGANIC BURNOUT | 20 | 20 |
| PETROLEUM JELLY | 5.0 | 5.0 |
| FORMIC ACID | 2.4 | 2.4 |
| BORIC ACID | 0.15 | 0.15 |

The carrier containing the sol-gel component, (shown in the first column), is a carrier according to the invention. The other is given for comparative purposes. The aluminas used are as indicated in Table 1. In both formulations water was added to make the mixture extrudable, (about 30%). The weights of the last three components in the chart are based on 100 parts by weight of the ceramic components.

TABLE 4

| | INVENTION | COMPARISON |
|---|---|---|
| WATER ABSORPTION % | 41.5 | 47.8 |
| PACK. DENSITY (LB/FT$^3$) | 47.2 | 44.9 |
| CRUSH STRENGTH (LB) | 15.4 | 11.4 |
| SURFACE AREA (M$^2$/GM) | 1.18 | 1.47 |
| FIRING TEMPERATURE (°C.) | 1482 | 1482 |
| ACID LEACHABLES (ppm) | | |
| sodium | 138 | 174 |
| potassium | 80 | 104 |
| calcium | 132 | 188 |
| aluminum | 394 | 460 |
| SELECTIVITY | +0.2 | −1 |

The packing density, crush strength, selectivity and surface area were measured as described in Table 2. The water absorption is a measure of the increase in weight of the carrier after being immersed in water and weighed.

The results indicate that the crush strength of the carrier of the invention is significantly increased by the presence of the sol-gel component while maintaining the surface area at over 1.1 m2/gm. The selectivity of a standard catalyst supported on the carrier of the invention is slightly better than the standard but significantly better than the same catalyst supported on a carrier without the sol-gel component. The carrier can therefore be expected to have a longer life than carriers made without the seed component.

EXAMPLE 4

This Example illustrates the performance of a carrier evaluated in the same way as is described in Example 2.

The carrier comprised:

40% by weight of alpha alumina particles with a median particle size of about 3 to 3.5 microns and a surface area of about 1 m2/gm;

52.1% by weight of gibbsite;

0.9% of alpha alumina seed particles with a median particle size of less than about 0.1 micron;

6% by weight of boehmite;

1% by weight of a ceramic bond; and 2.4% of formic acid.

The formulation comprised in addition the additives described in Example 2, (burnout material, petroleum jelly and boric acid), and water is added to make the formulation extrudable.

The carrier had a surface area of 1.06 m2/gm., a crush strength of 15.4 lb and packing density of 51.2 lb/ft3. All these properties are measured as described in Example 2.

The carrier, when evaluated as described in Example 2 had a selectivity increase of 0.5 which was obtained at a temperature that was 3° C. lower than for the standard.

EXAMPLE 5

This Example describes the effect of adding titania to a carrier formulation according to the invention. The formulations used are set out in Table 5 and the properties are described in Table 6.

TABLE 5

| CARRIER COMPOS. | CARRIER D | CARRIER E | CARRIER F | CARRIER G |
|---|---|---|---|---|
| ALPHA #1* | 46.6% | 46.6% | 46.6% | 46.6% |
| ALPHA #2* | 28% | 28% | 28% | 28% |
| ALPHA #3* (SEED) | 0.9% | 0.9% | 0.9% | 0.9% |
| GIBBSITE* | 18.7% | 18.7% | 18.7% | 18.7% |
| BOEHMITE* | 4.5% | 4.5% | 4.5% | 4.5% |
| CERAMIC BOND* | 1.3% | 1.3% | 1.3% | 1.3% |
| TiO₂* | 0.1% | 0.2% | 0.1% | 0.2% |
| ORG. BURN-OUT** | 11% | 11% | 11% | 11% |
| PET. JELLY** | 5% | 5% | 5% | 5% |
| BORIC ACID** | 0.15% | 0.15% | 0.15% | 0.15% |
| WATER (to make extrudable) | about 30% | about 30% | about 30% | about 30% |

*indicates "ceramic components" and percentages given are based on 100% of the ceramic components.
**percentages are based on total weight of ceramic components.

The "D" and "E" carriers were fired at 1420° C. and the "F" and "G" carriers were fired at 1480° C. The components were all as described in Example 2. The titanium oxide was in a hydrated form and had a surface area of about 250 m²/gm.

TABLE 6

| | CARRIER D | CARRIER E | CARRIER F | CARRIER G |
|---|---|---|---|---|
| SELECTIVITY | +0.7/−7 | +0.8/−11 | +0.7/−8 | +1.3/−8 |
| S.A. (M²/GM) | 1.15 | 1.01 | 0.86 | 0.70 |
| P.D. (LB/FT³) | 48.11 | 50.93 | 52.94 | 48.11 |
| C.S. (LB) | 12.6 | 14.9 | 18.0 | 15.4 |

"S.A." signifies surface area, "P.D." signifies settled packing density, and "C.S." signifies crush strength. All these, and the selectivity, are measured as indicated above.

The carriers of the present invention are useful in a variety of catalytic applications in which a gaseous stream is contacted with a catalyst supported on a carrier at elevated temperatures. There are many such processes in the petrochemical industry but the present carrier has proved itself particularly suitable in the catalytic formation of ethylene oxide from a gas stream comprising ethylene and oxygen. The utility of the present invention is however not so limited.

What is claimed

1. An alpha alumina based catalyst carrier having a crush strength of at least 5 pounds and a packing density of at least 38 pounds/cubic foot which comprises first and second alpha alumina components with a first alpha alumina component in the form of particles having an median crystallite size of from about 0.4 to about 4 microns providing from about 95 to about 40% of the total weight of alpha alumina in the carrier and a second alpha alumina component generated in situ by a sol-gel process and providing the balance of the alpha alumina in the carrier.

2. A catalyst carrier according to claim 1 in which the first alpha alumina component comprises a larger particle size component and a smaller particle size component in which the larger component provides from about 10 to about 90% by weight of the first component weight in the form of particles with a median particle size less than 4 and greater than 2.5 microns and a average crystallite size of from about 1.5 to about 2.5 microns, and a smaller component providing from about 90 to about 10% by weight of the first component in the form of particles with a median particle size greater than 4 and less than about 10 microns and an average crystallite size of from about 0.4 to about 0.8 micron.

3. A catalyst carrier according to claim 1 in which the second alpha alumina component is generated by a seeded sol-gel process.

4. A catalyst carrier according to claim 3 in which the sol-gel alumina is seeded with an effective amount of sub-micron alpha alumina seed.

5. A catalyst carrier according to claim 1 which further comprises from about 0.08 to about 0.5%, based on the weight of alumina in the carrier, of added titania.

6. A catalyst carrier according to claim 5 in which the titania has a surface area of at least 8 square meters per gram.

7. A catalyst carrier according to claim 1 comprising a pore volume of from about 0.3 to about 0.6 cc. Hg/gram.

8. A catalyst carrier according to claim 1 which further comprises a ceramic bond material in an amount that is from about 1 to about 3% of the weight of the alumina components, expressed as alpha alumina, in the carrier.

9. A catalyst carrier having a crush strength of at least 5 pounds and a settled pack density of at least 35 pounds/cubic foot which comprises first and second alpha alumina components;
wherein the first alpha alumina component has two constituents including:
i) a first constituent providing from about 40 to about 80% by weight of the first alpha alumina component and having a median particle size of from about 3 to about 4 microns; and
ii) a second constituent providing from about 20 to about 60% of the weight of the first alpha alumina component and having a median particle size of from about 4 to about 8 microns;
said first alpha alumina component providing from about 95 to about 65% of the total weight of alpha alumina in the carrier and;
a second alpha alumina component generated in situ by a sol-gel process and providing the balance of the alpha alumina in the carrier.

10. A catalyst carrier according to claim 9 which further comprises from about 0.05 to about 0.5 % by weight of titania.

11. A process for the production of a catalyst carrier which comprises:
i) forming a mixture comprising:
   a. at least one alpha alumina component with an median particle size of from 3 to about 8 microns and:
   b. a hydrated precursor of alpha alumina in an amount sufficient to provide from about 5 to about 60% by weight of the total weight of alpha alumina in the catalyst carrier product;
   c. from about 5 to about 40%, based on the weight of the alpha alumina, of a burnout material; and
   d. water in sufficient quantity to extrude the above mixture;
ii) extruding the mixture into the desired shapes; and iii) firing to convert the precursor of alpha alumina to alpha alumina so as to produce a catalyst carrier in which alpha alumina particles with a median particle size of from about 3 to about 8 microns are dispersed in a matrix of alpha alumina derived from the precursor material.

12. A process according to claim 11 in which the precursor of alpha alumina comprises a boehmite.

13. A process according to claim 11 in which the precursor of alpha alumina comprises alumina trihydrate.

14. A process according to claim 11 in which the precursor of alpha alumina is seeded with sub-micron sized particles of alpha alumina in an amount that is from about 0.2 to about 5% by weight based on the total alumina weight, measured as alpha alumina, in the catalyst carrier.

15. A process according to claim 11 in which from about 0.05 to about 0.5% based on the total weight of alumina in the formulation expressed as alpha alumina, of titania is added to the mixture to be extruded.

16. A process according to claim 11 in which a ceramic bond material is added to the extrudable mixture in an amount that is from about 1 to about 3% of the weight of the alumina components, expressed as alpha alumina, in the mixture.

17. A process for the production of a catalyst carrier which comprises:
   i) forming a mixture comprising:
      a. an alpha alumina having a first component with a median particle size of from about 2 to about 4 microns and a second component with a median particle size of about 4 to about 8 microns;
      b. a seeded, hydrated precursor of alpha alumina in an amount sufficient to provide from about 5 to about 60% by weight of the total weight of alpha alumina in the catalyst carrier product
      c. from about 5 to about 40%, based on the weight of the alpha alumina, of a burnout material;
      d. from about 1 to about 3% based on the weight of alumina in the composition expressed as alpha alumina, of a ceramic bond material;
      e. from about 0.05 to about 0.5% by weight, based on the total alumina weight in the mixture expressed as alpha alumina, of titania; and
      f. water in sufficient quantity to extrude the above mixture;
   ii) extruding the mixture into the desired shape; and
   iii) firing to convert the seeded precursor of alpha alumina to alpha alumina so as to produce a catalyst carrier in which alpha alumina particles with a median particle size of from about 3 to about 8 microns are dispersed in a matrix of alpha alumina derived from the seeded precursor material.

18. A process according to claim 17 in which the precursor of alpha alumina comprises a boehmite.

19. A process according to claim 17 in which the precursor of alpha alumina further comprises from about 10 to about 35% by weight of alumina trihydrate, measured as the alpha alumina equivalent, based on the total weight of alpha alumina in the carrier product.

20. A process according to claim 17 in which the precursor of alpha alumina is seeded with a sub-micron sized particles of alpha alumina in an amount that is from about 0.2 to about 5% by weight based on the total alumina weight, measured as alpha alumina, in the catalyst carrier.

* * * * *